(12) United States Patent
Kwak

(10) Patent No.: US 9,798,904 B2
(45) Date of Patent: Oct. 24, 2017

(54) IC CARD READER AND OPERATING METHOD THEREOF

(71) Applicant: LG CNS Co., Ltd., Seoul (KR)

(72) Inventor: Chang Ryong Kwak, Seoul (KR)

(73) Assignee: LG CNS CO., LTD., Seoul (KR)

( * ) Notice: Subject to any disclaimer, the term of this patent is extended or adjusted under 35 U.S.C. 154(b) by 276 days.

(21) Appl. No.: 14/587,339

(22) Filed: Dec. 31, 2014

(65) Prior Publication Data

US 2015/0310233 A1    Oct. 29, 2015

(30) Foreign Application Priority Data

Apr. 29, 2014    (KR) .................. 10-2014-0051728

(51) Int. Cl.
*G06K 7/00* (2006.01)
*G06K 19/077* (2006.01)

(52) U.S. Cl.
CPC ..... *G06K 7/0004* (2013.01); *G06K 19/07766* (2013.01)

(58) Field of Classification Search
USPC .................. 235/487, 488, 492, 493, 494
See application file for complete search history.

(56) References Cited

U.S. PATENT DOCUMENTS

| 6,557,754 B2* | 5/2003 | Gray .................... G06K 7/0008 235/375 |
| 2014/0191031 A1* | 7/2014 | Paulsen ............ G06K 19/07769 235/440 |

FOREIGN PATENT DOCUMENTS

| JP | 2003-271902 A | 9/2003 |
| JP | 2003-303322 A | 10/2003 |

\* cited by examiner

*Primary Examiner* — Michael G Lee
(74) *Attorney, Agent, or Firm* — Saliwanchik, Lloyd & Eisenschenk

(57) ABSTRACT

An IC card reader may comprise a first interface unit that communicates with an IC chip of an IC card by using a first communication mode, a second interface unit that communicates with the IC chip by using a second communication mode, and a control unit that controls the first and second interface units, and reads data from the IC chip through an interface unit, which first receives a response message from the IC chip, between the first and second interface units.

15 Claims, 4 Drawing Sheets

IC CARD READER AND OPERATING METHOD THEREOF

CROSS-REFERENCES TO RELATED APPLICATION

This application claims the benefit under 35 U.S.C. §119 of Korean Patent Application No. 10-2014-0051728, filed Apr. 29, 2014, which is hereby incorporated by reference in its entirety.

BACKGROUND

Technical Field

The present disclosure relates to an IC card reader and an operating method thereof.

Related Art

Since an IC chip can store a great amount of information and perform high level of encryption processing by using a CPU and a memory included therein, it has superior security. Since an IC card called a smart card has such an IC chip therein and can store and process information, it has been widely utilized as a payment device capable of minimizing the forgery probability of a magnetic card and providing various services. Since the IC card has a storage capacity superior to that of an existing magnetic card, it can perform various additional functions for which separate information storage is requested and is advantageous in that it is possible to improve a security problem. In this regard, the government enforces an IC card use obligation policy for replacing the existing magnetic card with the IC card.

The IC card is classified into a contact type IC card and a contactless type IC card according to a data read method. The contact type IC card has a metal pattern in front of the card and is the most general IC card. The contactless type IC card has a wireless communication module and an antenna therein. An IC card having contact and contactless functions is called a hybrid card or a combi card.

BRIEF SUMMARY

Various embodiments are directed to an IC card reader capable of reading data from an IC card by using contact type and contactless type communication modes and an operating method thereof.

The technical problems of the present disclosure are limited to the aforementioned technical problems, and other unmentioned technical problems will be apparently understood by those skilled in the art from the following description.

In one embodiment, an IC card reader may comprise: a first interface unit that communicates with an IC chip of an IC card by using a first communication mode; a second interface unit that communicates with the IC chip by using a second communication mode; and a control unit that controls the first and second interface units, and reads data from the IC chip through an interface unit, which first receives a response message from the IC chip, between the first and second interface units.

In one embodiment, an operating method of an IC card reader may comprise the steps of: attempting communication with an IC chip of an IC card by using a first communication mode; attempting communication with the IC chip by using a second communication mode; receiving at least one of a first response message based on communication using the first communication mode and a second response message based on communication using the second communication mode from the IC chip; and reading data from the IC chip by using a communication mode of the first communication mode and the second communication mode, which corresponds to a response message that is first received between the first response message and the second response message.

In accordance with an IC card reader and an operating method thereof according to one embodiment of the present disclosure, it is possible to read data from an IC card by using contact type and contactless type communication modes.

Consequently, it is possible to select any one of the contact type and contactless type communication modes and to read data from the IC card.

Furthermore, when communication failure occurs due to a contact error of the IC card, a contact error of an IC card reader, or abnormal insertion of the IC card, it is possible to read data from the IC card by using the contactless type communication mode.

DETAILED DESCRIPTION

Figure 1:
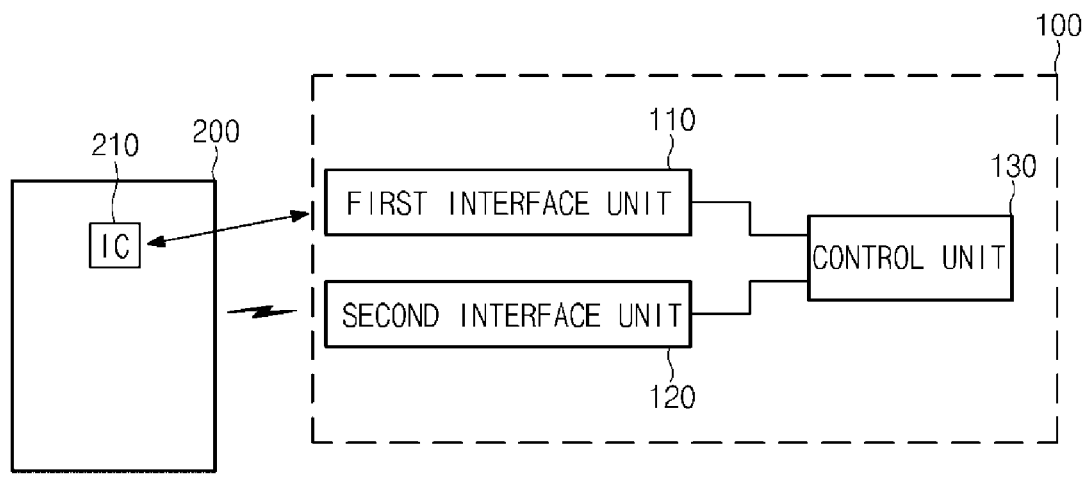
FIG. 1 is a block diagram illustrating an IC card reader according to one embodiment of the present disclosure.

Hereinafter, some exemplary embodiments of the present disclosure will be described in detail with reference to the accompanying drawings through various examples of embodiments. It is to be noted that in assigning reference numerals to elements in the drawings, the same reference numerals denote the same elements throughout the drawings even in cases where the elements are shown in different drawings. Furthermore, in describing the embodiments of the present disclosure, a detailed description of the known configurations or functions will be omitted if it is deemed to obscure the understanding for the embodiments of the present disclosure.

Furthermore, in describing the elements of the embodiments the present disclosure, terms, such as the first, the second, A, B, (a), and (b) may be used. However, although the terms are used only to distinguish one element from the other element, the essence, order, or sequence of the elements are not limited by the terms. When it is said that one element is "connected", "combined", or "coupled", with the other element, the one element may be directly connected or coupled to the other element, but it should also be understood that a third element may be "connected", "combined", or "coupled" between the two elements.

An IC card reader according to one embodiment of the present disclosure may be mounted in a financial device such as a financial automatic device (ATM: automatic teller's machine). Such a financial device, for example, is a device that performs a financial businesses, i.e., for receiving various media such as paper money, securities, giro, a coin, or a gift certificate, and medium processing comprising such as deposit processing, giro receipt, gift certificate exchange and the like, and/or processing of withdrawal processing, giro discharge, gift certificate discharge and the like. An example of such a financial device may comprise an automatic teller machine(ATM) such as a cash dispenser (CD) or a cash recycling device. However, the financial device is not limited to the aforementioned example, and may also be an apparatus for automating a financial task such as a financial information system (FIS).

Figure 2:
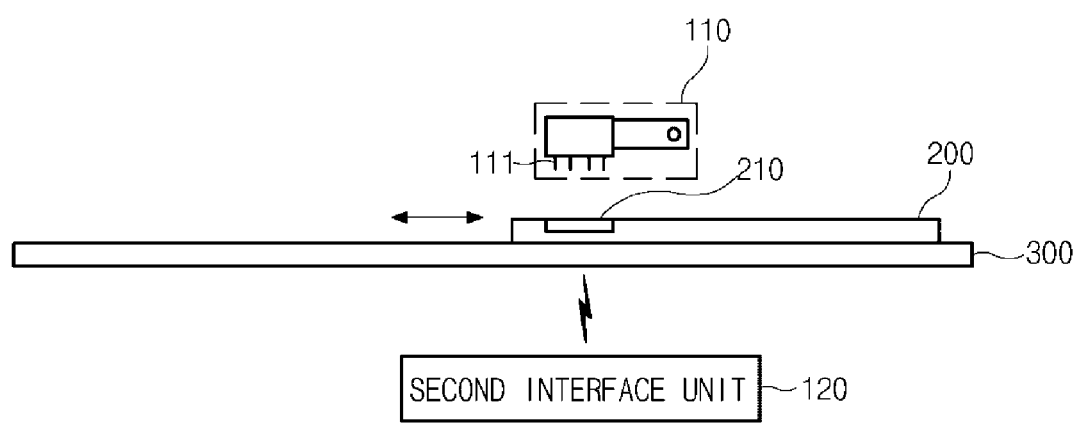
FIG. 2 is a diagram for explaining an operation of an IC card reader according to one embodiment of the present disclosure.

FIG. 1 is a block diagram illustrating an IC card reader according to one embodiment of the present disclosure, and FIG. 2 is a diagram for explaining an operation of the IC card reader according to one embodiment of the present disclosure.

In FIG. 1, a description will be given on the assumption that an IC card 200 provided with an IC chip 210 has been inserted into an IC card reader 100 in order to facilitate understanding. Furthermore, it is assumed that the IC card 200 inserted into the IC card reader 100 is a hybrid card or a combi card.

Referring to FIG. 1, the IC card reader 100 according to one embodiment of the present disclosure may comprise a first interface unit 110, a second interface unit 120, and a control unit 130.

The first interface unit 110 may communicate with the IC chip 210 by using a first communication mode. The first communication mode may represent a mode of communicating with the IC chip 210 while contacting with the IC chip 210. The first interface unit 110 may supply power to the IC chip 210 while contacting with the IC chip 210, so that the IC chip 210 may transmit a response message defined in advance to the first interface unit 110. The response message, for example, may be an ATR (Answer To Reset) response message (hereinafter, referred to as a "first response message").

The second interface unit 120 may communicate with the IC chip 210 by using a second communication mode. The second communication mode may represent a mode of performing contactless communication (that is, wireless communication) with the IC chip 210. The second interface unit 120 may supply power to the IC card 200. The second interface unit 120 may recognize the type (for example, types A, B, and Mifare) of the IC card 200, set an appropriate protocol according to each type, and establish a communication link with the IC chip 210 of the IC card 200. When the communication session is established, the IC chip 210 may transmit a response message (hereinafter, referred to as a "second response message") to the second interface unit 120.

The control unit 130 may control the first interface unit 110 and the second interface unit 120. For example, the control unit 130 may control the first interface unit 110 and the second interface unit 120 such that the first interface unit 110 attempts to communicate with the IC chip 210 by using the first communication mode and simultaneously the second interface unit 120 attempts to communicate with the IC chip 210 by using the second communication mode.

The control unit 130 may read data from the IC chip 210 through an interface unit, which first receives a response message from the IC chip 210, between the first interface unit 110 and the second interface unit 120. In general, the first interface unit 110 may receive the first response message before the second interface unit 120 receives the second response message (in the case of the contact communication mode, the IC chip 210 receives power and immediately transmits a response message); however, the present disclosure is not limited thereto.

Furthermore, when failure occurs in the process of reading data from the IC chip 210 through the first interface unit 110, the control unit 130 may read the data by using the second interface unit 120. That is, the IC card reader 100 may selectively use the first interface unit (the contact communication mode, 110) and the second interface unit (the contactless communication mode, 120). For example, the data may comprise bank account numbers, transaction passwords, additional customer information and the like.

With reference to FIG. 2, the operation of the IC card reader 100 will be described in more detail. The IC card 200 may be inserted into the IC card reader 100 through a transfer unit 300. The transfer unit 300, for example, may be prepared in the form of a conveyor. The transfer unit 300 may transfer the IC card 200 to a contact point with the first interface unit 110. The contact point, for example, may be arranged at a position at which the IC chip 210 and the first interface unit 110 faces each other, so that it may be defined as a point at which the metal pattern of the IC chip 210 and the first interface unit 110 contact with each other.

The first interface unit 110 may comprise at least one contact pin 111 contacting with the IC chip 210. The contact pin 111 may contact with at least one contact point on the metal pattern of the IC chip 210 and detect a specific signal. For example, the specific signal may be at least one of signals detectable from the IC chip 210, for example, a power signal Vcc, a reset signal Reset, a clock signal CLK, a ground signal GND, and a data input/output signal (I/O). Hereinafter, the specific signal is assumed to be the power signal Vcc; however, the present disclosure is not limited thereto.

Meanwhile, in the case in which the first response message is not received through the first interface unit 110 and the second response message is not received through the second interface unit 120, the control unit (130, referring to FIG. 3) may determine whether the specific signal is normally detected from the IC chip 210 through the at least one contact pin 111 of the first interface unit 110. The case, in which the first response message is not received through the first interface unit 110 and the second response message is not received through the second interface unit 120, may comprise the case in which an IC card has not been normally inserted, or the case in which an IC chip is faulty.

When the specific signal is normally detected, the control unit 130 may allow the at least one contact pin 111 to contact with the IC chip 210 again. However, when the specific signal is not normally detected, the control unit 130 may set the contact point of the IC card 200 again. For example, the control unit 130 may control the transfer unit 300 to repeatedly move the IC card 200 in an insertion direction and/or an opposite direction thereof, thereby setting the contact point of the IC card 200 again.

As described above, the IC card reader 100 according to one embodiment of the present disclosure may read data by perform contact communication and/or contactless communication with the IC chip 210. For example, when failure occurs in the process of performing communication (for example, reading data from) with the IC chip 210 by using the first interface unit 110, the IC card reader 100 may continuously perform communication with the IC chip 210 by using the second interface unit 120. Consequently, even though the aforementioned failure of the IC chip 210 occurs, it is possible to continuously perform communication with the IC chip 210 by using a communication mode different from a communication mode in which the failure has occurred.

Furthermore, when the first response message is not received through the first interface unit 110 and the second response message is not received through the second interface unit 120, IC card reader 100 may determine whether the specific signal is normally detected from the IC chip 210, and then may set the contact point of the IC card 200 again only when the specific signal is not normally detected.

Consequently, in the IC card reader 100 according to one embodiment of the present disclosure, an operation for setting the contact point again is not performed or is minimized according to whether the specific signal is normally detected, so that it is possible to reduce a time required for setting the contact point again, and to reduce the abrasion of the contact pin 111 occurring when the contact pin 111 is allowed to contact with the IC chip 210 again several times in the occurrence of failure.

Figure 3:
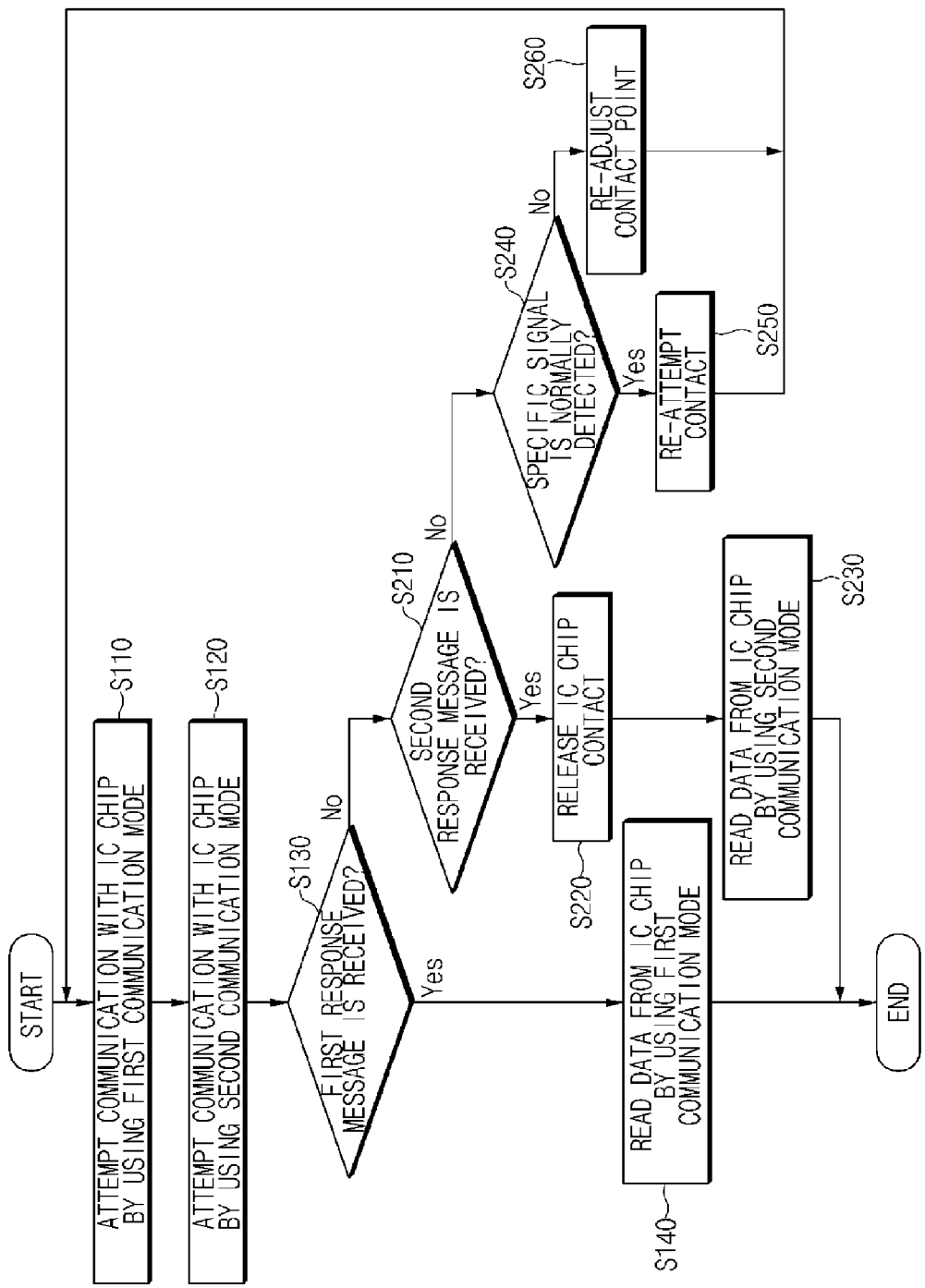
FIG. 3 is a flowchart for explaining an operating method of an IC card reader according to one embodiment of the present disclosure.

FIG. 3 is a flowchart for explaining an operating method of the IC card reader according to one embodiment of the present disclosure.

Referring to FIG. 3, the operating method of the IC card reader according to one embodiment of the present disclosure may comprise a step S110 of attempting communication with an IC chip by using a first communication mode, a step S120 of attempting communication with the IC chip by using a second communication mode, a step S130 of determining whether a first response message is received, and a step S140 of reading data from the IC chip by using the first communication mode when the first response message is received.

Furthermore, the operating method may further comprise a step S210 of determining whether a second response message is received when the first response message is not received, a step S220 of releasing a contact between the first interface unit and the IC chip when the second response message is received, and a step S230 of reading data from the IC chip by using the second communication mode.

Furthermore, the operating method may further comprise a step S240 of determining whether a specific signal is normally detected when the second response message is not received, a step S250 of re-attempting a contact with the IC chip when the specific signal is normally detected, and a step S260 of re-adjusting a contact point of the IC chip when the specific signal is not normally detected.

Hereinafter, the aforementioned steps S110, S120, S130, and S140 and steps S210, S220, S230, S240, S250, and S260 will be described in detail with reference to FIG. 1 and FIG. 3.

In step S110, the first interface unit 110 may attempt communication with the IC chip 210 by using the first communication mode. For example, the first communication mode may represent a mode of communicating with the IC chip 210 while contacting with the IC chip 210.

In step S120, the second interface unit 120 may attempt communication with the IC chip 210 by using the second communication mode. For example, the second communication mode may represent a mode of performing contactless communication with the IC chip 210.

Step S110 and step S120 may be simultaneously performed. That is, the control unit 130 may control the first interface unit 110 and the second interface unit 120 such that the first interface unit 110 communicates with the IC chip 210 by using the first communication mode and simultaneously the second interface unit 120 communicates with the IC chip 210 by using the second communication mode. Furthermore, step S120 may also be performed before step S110.

In step S130, the control unit 130 may determine whether the first response message is received from the IC chip 210 through the first interface unit 110. As a result of the determination, when the first response message is received, step S140 is performed. However, when the first response message is not received, step S210 is performed.

In step S140, the control unit 130 may read data from the IC chip 210 through the first interface unit 110.

In step S210, the control unit 130 may determine whether the second response message is received. As a result of the determination, when the second response message is received, step S220 is performed. However, when the second response message is not received, step S240 is performed.

In step S220, the control unit 130 may control the first interface unit 110 to release a contact of the contact pin 111 from the IC chip 210.

In step S230, the control unit 130 may read data from the IC chip 210 through the second interface unit 120.

In step S240, the control unit 130 may determine whether the specific signal is normally detected from the IC chip 210 through the first interface unit 110. The specific signal, for example, may be the power signal Vcc as described in FIG. 2.

In step S250, when the specific signal is normally detected, the control unit 130 may control the first interface unit 110 to re-attempt a contact with the IC chip 210.

In step S260, when the specific signal is not normally detected, the control unit 130 may control the transfer unit 300 to re-adjust a contact point of the IC chip 210. After step S260, step S110 may be performed again. However, such a process is not unlimitedly repeated, and may be set to be repeated only when a predetermined number of times (for example, twice or three times) is reached.

Figure 4:
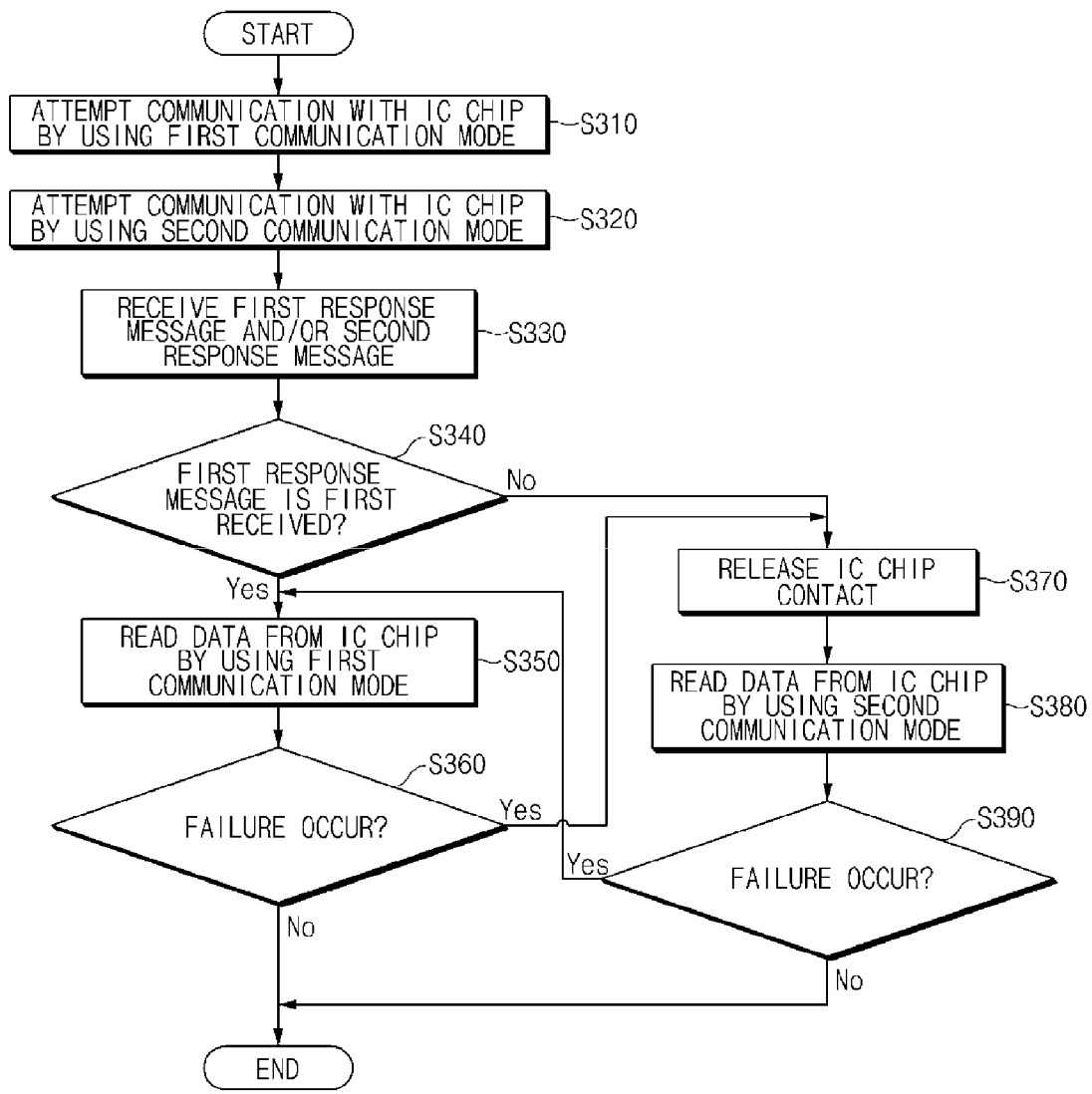
FIG. 4 is a flowchart for explaining an operating method of an IC card reader according to another embodiment of the present disclosure.

FIG. 4 is a flowchart for explaining an operating method of the IC card reader according to another embodiment of the present disclosure.

Referring to FIG. 4, the operating method of the IC card reader according to another embodiment of the present disclosure may comprise a step S310 of attempting communication with an IC chip by using a first communication mode, a step S320 of attempting communication with the IC chip by using a second communication mode, a step S330 of receiving a first response message based on communication using the first communication mode and/or a second response message based on communication using the second communication mode from the IC chip, a step S340 of determining whether any one of the first response message and the second response message is first received, a step S350 of reading data from the IC chip by using the first communication mode when the first response message is first received, and a step S360 of determining whether failure has occurred in the data reading.

Furthermore, the operating method may further comprise a step S370 of releasing a contact between the first interface unit and the IC chip when the failure has occurred in the data reading as a result of the determination of step S360, a step S380 of reading data from the IC chip by using the second communication mode, and a step S390 of determining whether failure has occurred in the data reading.

As a result of the determination of step S390, when the failure has occurred in the data reading, step S350 may be performed again.

Hereinafter, the aforementioned steps S310, S320, S330, S340, S350, S360, S370, S380, and S390 will be described in detail with reference to FIG. 1 and FIG. 4. However, a detailed description of steps overlapping the steps described in FIG. 3 will be omitted.

Steps S310, S320, S330, S340, and S350 may be performed substantially similarly to steps S110, S120, S130, and S140 described in FIG. 3.

In step S360, the control unit 130 may determine whether failure has occurred in the process of reading data from the IC chip 210 through the first interface unit 110. As a result of the determination, when the failure has occurred, step S370 may be performed.

In step S370, the control unit 130 may control the first interface unit 110 to release a contact of the contact pin 111 from the IC chip 210.

In step S380, the control unit 130 may control the second interface unit 120 to communicate with the IC chip 210 according to the second communication mode, thereby reading data.

In step S390, the control unit 130 may determine whether failure has occurred in the process of reading data from the IC chip 210 through the second interface unit 120, similarly to step S360. As a result of the determination, when the failure has occurred, step S350 may be performed.

Accordingly, according to the aforementioned operating method of the IC card reader, when failure has occurred in the process of reading data from the IC chip 210 by using the first communication mode or the second communication mode, it is possible to continuously communicate with the IC chip 210 by using a communication mode (for example, the second communication mode) different from a mode (for example, the first communication mode) in which the failure has occurred.

Figure 5:
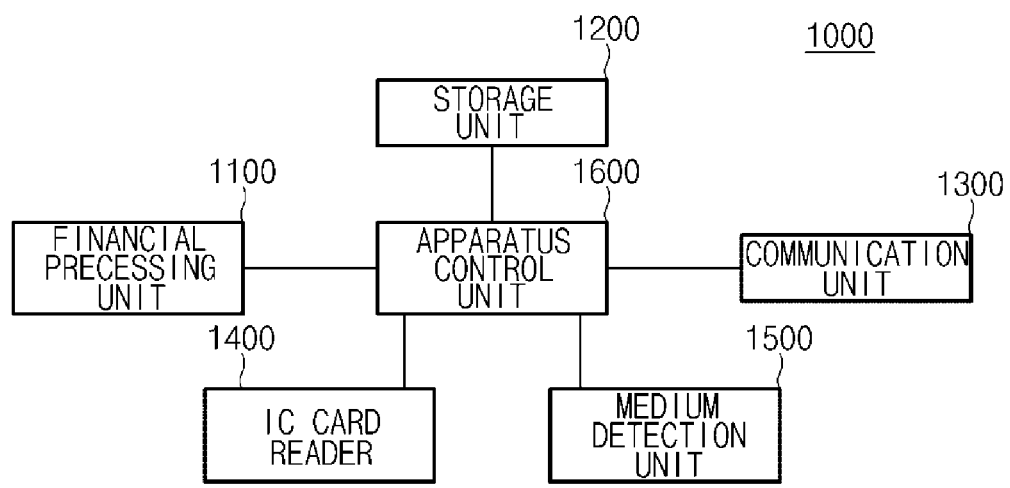
FIG. 5 is a block diagram illustrating a financial device including an IC card reader according to one embodiment of the present disclosure.

FIG. 5 is a block diagram illustrating a financial device including the IC card reader according to one embodiment of the present disclosure.

Hereinafter, the embodiment of the present disclosure will be described on the assumption that the financial device is a financial automatic device. Such assumption is for illustrative purposes only, and the technical spirit of the present disclosure is not limited to the financial automatic device. Furthermore, an IC card inserted into the financial device is assumed to be a hybrid card or a combi card.

Referring to FIG. 5, a financial automatic device 1000 according to one embodiment of the present disclosure may comprise a financial processing unit 1100, a storage unit 1200, a communication unit 1300, an IC card reader 1400, a medium detection unit 1500, and an apparatus control unit 1600.

The financial processing unit 1100 may process a financial transaction service requested by customers through communication with a financial host (not illustrated).

The storage unit 1200 may store various types of data and programs necessary for a general operation of the financial automatic device 1000. For example, the storage unit 1200 may store full text of transactions, financial transaction information and the like which are transmitted from an external server and a financial host.

The communication unit 1300 may communicate with other financial automatic device and financial hosts.

The IC card reader 1400 read data from an IC card when the IC card is inserted by a customer. The data, for example, may comprise bank account numbers, transaction passwords, additional customer information and the like. As described above, the IC card reader 1400 may communicate with an IC chip of the IC card by respectively using contact and contactless communication modes through the first interface unit (110, referring to FIG. 1) and the second interface unit (120, referring to FIG. 1), and read data from the IC chip through an interface unit, which first receives a response message from the IC chip, between the first interface unit 110 and the second interface unit 120.

The medium detection unit 1500 may detect the number of media provided to a customer according to the media (for example, paper money, securities, giro, or a gift certificate) inserted by the customer, or a processing result of the financial processing unit 1100.

The apparatus control unit 1600 may control the general operation of the financial processing unit 1100. For example, the apparatus control unit 1600 may control the aforementioned operations of the financial processing unit 1100, the storage unit 1200, the communication unit 1300, the IC card reader 1400, and the medium detection unit 1500.

As described above, the IC card reader 1400 according to one embodiment of the present disclosure can continuously communicate with the IC chip 210 by using a communication mode (for example, the second communication mode) different from a communication mode (for example, the first communication mode) in which failure has occurred even though the failure has occurred in IC chip 210. Consequently, it is possible to improve efficiency when operating the financial device.

In the above description, although all elements constituting the embodiments of the present disclosure have been described as being combined into a single body or as being combined into and operated as a single body, the present disclosure is not necessarily limited by these embodiments. That is, one or more of all the elements may be selectively combined and operated within the scope of the present disclosure. Furthermore, all the elements may be individually implemented as independent hardware devices, but some or all of the elements may also be selectively combined and implemented in the form of a computer program having program modules which perform some or all of the functions combined by one or more hardware devices. Codes and code segments constituting the computer program may be easily inferred by those skilled in the art of the present disclosure. Such a computer program is stored in computer-readable media and is read and executed by a computer, so that the embodiments of the present disclosure may be implemented. The storage media of the computer program may comprise magnetic recording media, optical recording media, carrier wave media, and the like.

Furthermore, such terms as "comprise", "include", or "have" mean that the relevant elements may be included unless otherwise defined, so that it should be interpreted that other elements may be further included rather than being excluded. All terms including technical or scientific terms have the same meanings as the terms generally understood by those skilled in the art to which the present disclosure pertains, unless otherwise defined. The terms identical to those defined in dictionaries should be interpreted as having meanings identical to contextual meanings of the related art, and are not interpreted as being ideal or excessively formal meanings unless they are definitely defined in the present disclosure.

The above description is merely intended to illustratively describe the technical spirit of the present disclosure, and various changes and modifications can be made by those skilled in the art to which the present disclosure pertains without departing from the essential features of the present disclosure. Therefore, the embodiments disclosed in the present disclosure are not intended to limit the technical spirit of the present disclosure, but are intended to describe the present disclosure. The scope of the technical spirit of the present disclosure is not limited by these embodiments. The scope of the present disclosure should be interpreted by the accompanying claims and all technical spirits falling within the equivalent scope should be interpreted as being included in the scope of the present disclosure.

What is claimed is:

1. An IC card reader comprising:
   a first interface unit configured to communicate with an IC chip of an IC card by using a first communication mode;
   a second interface unit configured to communicate with the IC chip by using a second communication mode; and
   a control unit configured to control the first and second interface units such that the first and second interface units simultaneously communicate with the IC chip, and read data from the IC chip through an interface unit, which first receives a response message from the IC chip, between the first and second interface units.

2. The IC card reader according to claim 1, wherein the first communication mode is a mode of communicating with the IC chip while contacting with the IC chip and the second communication mode is a contactless communication mode.

3. The IC card reader according to claim 2, wherein, when failure occurs in a process of reading the data through the first interface unit, the control unit reads the data by using the second interface unit.

4. The IC card reader according to claim 3, wherein, when failure occurs in the process of communicating with the IC chip through the first interface unit and the second interface unit, the control unit determines whether a specific signal is normally detected through at least one contact pin of the first interface unit.

5. The IC card reader according to claim 4, wherein, when the specific signal is normally detected, the control unit allows the at least one contact pin to contact with the IC chip again.

6. The IC card reader according to claim 4, wherein, when the specific signal is not normally detected, the control unit sets a contact point of the IC card again.

7. An operating method of an IC card reader, comprising the steps of:
   attempting communication with an IC chip of an IC card by using a first communication mode;
   attempting communication with the IC chip by using a second communication mode simultaneous with the step of attempting the communication with the IC chip by using the first communication mode;
   receiving at least one of a first response message based on communication using the first communication mode and a second response message based on communication using the second communication mode from the IC chip; and
   reading data from the IC chip by using a communication mode of the first communication mode and the second communication mode, which corresponds to a response message that is first received between the first response message and the second response message.

8. The operating method of an IC card reader according to claim 7, wherein, in the step of receiving the at least one of the first response message based on the communication using the first communication mode and the second response message based on the communication using the second communication mode from the IC chip, when the first response message is not received, it is determined whether the second response message is received.

9. The operating method of an IC card reader according to claim 8, further comprising the step of:
   releasing a contact between a first interface unit and the IC chip when the second response message is received.

10. The operating method of an IC card reader according to claim 9, further comprising the step of:
    determining whether a specific signal is normally detected when the second response message is not received.

11. The operating method of an IC card reader according to claim 10, further comprising the step of:
    re-attempting a contact between the first interface unit and the IC chip when the specific signal is normally detected.

12. The operating method of an IC card reader according to claim 10, further comprising the step of:
    re-adjusting a contact point between the first interface unit and the IC chip when the specific signal is not normally detected.

13. The operating method of an IC card reader according to claim 9, wherein the specific signal comprises a power signal.

14. The operating method of an IC card reader according to claim 7, wherein the first communication mode is a mode of communicating with the IC chip while contacting with the IC chip and the second communication mode is a contactless communication mode.

15. An IC card reader comprising:
    a first interface unit configured to communicate with an IC chip of an IC card by using a first communication mode;
    a second interface unit configured to communicate with the IC chip by using a second communication mode; and
    a control unit configured to control the first and second interface units to communicate with the IC chip simultaneously, read data from the IC chip through the second interface unit when failure occurs in the first interface unit, and read data from the IC chip through the first interface unit when failure occurs in the second interface unit.

* * * * *